Feb. 17, 1925.  1,527,065
C. G. PAPANT
DIES
Filed June 16, 1921  2 Sheets-Sheet 1
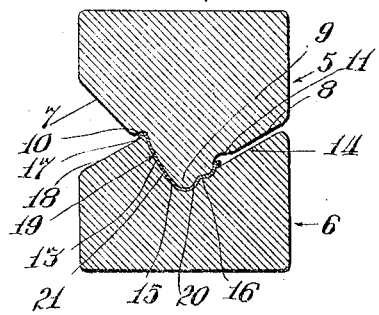
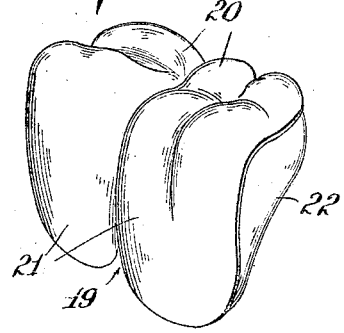
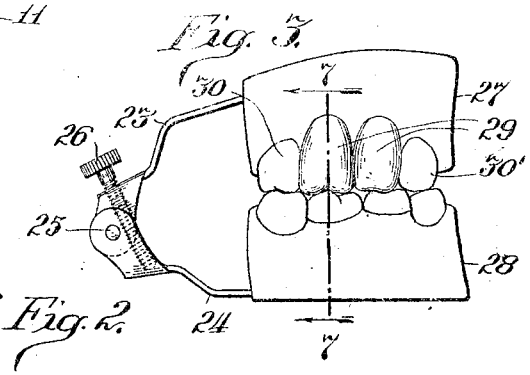
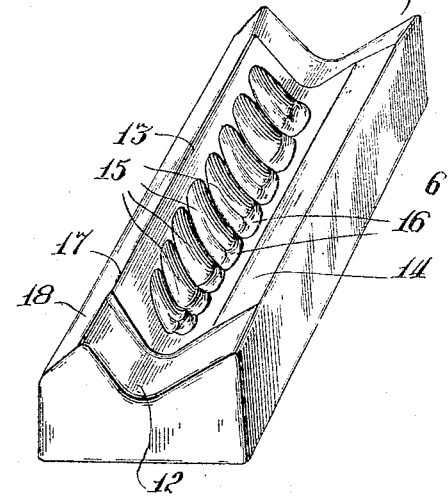
Inventor
Christ G. Papant Feb. 17, 1925.
C. G. PAPANT
DIES
Filed June 16, 1921  2 Sheets-Sheet 2
1,527,065
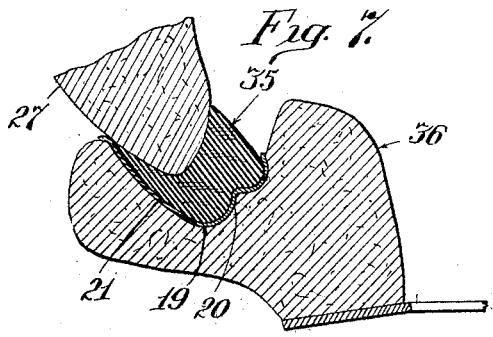
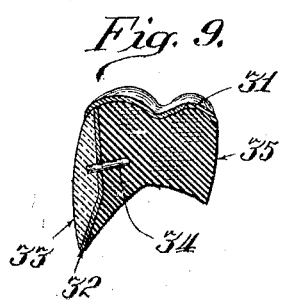
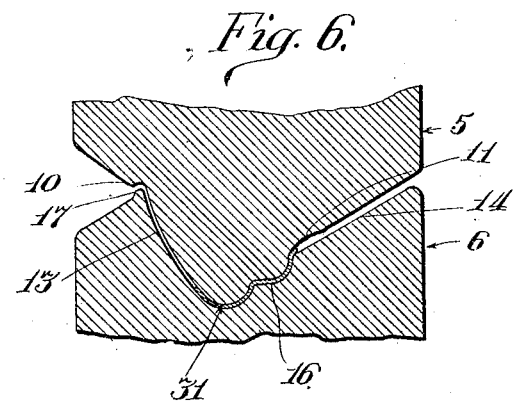
Inventor
Christ G Papant
By Daniel V Brennan
Attorney Patented Feb. 17, 1925.

1,527,065

UNITED STATES PATENT OFFICE.

CHRIST G. PAPANT, OF CHICAGO, ILLINOIS.

DIES.

Application filed June 16, 1921. Serial No. 478,009.

*To all whom it may concern:*

Be it known that I, CHRIST G. PAPANT, a citizen of the United States, residing at Chicago, county of Cook, and State of Illinois, have invented a new and useful Improvement in Dies, of which the following is a specification.

This invention relates to dentistry and more particularly to that part of this art pertaining to bridge-work.

As is well known to those skilled in the art, two methods have, in the past, been employed for reproducing a plaster cusp in gold, namely, by the swaging method, or by casting. The former is by far the more popular, and my present invention is directed toward and has as its primary aim the improvement of this method, by rendering it possible to more quickly and accurately form the gold cusp and tooth contour where both are to be of gold, or to facilitate the construction of the cusp for use on a tooth having a porcelain facing.

Previously, in the swaging method, the operator took an impression of the abutment teeth or those immediately adjacent to the teeth which were supplied to be in a bridge, for the purpose of making a model from which to form the artificial bridge, this impression being made in plaster and reproduced in relief and placed in an articulator, on which latter the bridge is plotted and laid out so that the proper occlusion may be obtained.

In forming the cusp, considerable time was consumed, as it has been necessary under the old method to make a die, and furthermore where two or more teeth form the bridge the separate cusps and facings had to be connected by solder in addition to their connection to the solder filling or to the coping or band. Under my present method and with the means provided I eliminate the double-soldering preferably forming the cusp integrally with the gold buccal, in one instance, and also making it possible, if desired to make two or more adjacent cusps or cusps and buccal surfaces of a single stamping.

Other aims of this invention, together with a more concrete understanding of the same, may be obtained from the following detail description and the claims, taken with the accompanying drawings, in which:

Figure 1 is a transverse sectional view of a die constructed in accordance with my invention, after forming a cusp and buccal.

Figure 2 includes two perspective views of the male and female portions of the die separated.

Figure 3 is a side elevation of the so-called articulator for carrying the cusps for obtaining perfect occlusion.

Figure 4 is a perspective view of a pair of gold cusps and buccal portions constructed integrally and ready for insertion in the articulator.

Figure 5 is a sectional detail of a cusp and buccal.

Figure 6 is another view like Figure 1, the die forming the cusp only.

Figure 7 is an enlarged sectional view of a portion of the articulator taken on line 7—7 of Figure 3, looking in the direction indicated by the arrows.

Figure 8 is the stamping in section filled with wax.

Figure 9 is a similar stamping arranged for a porcelain facing.

Figure 10 is a perspective rear view of the porcelain facings.

Figure 11 is a sectional view of the same secured to the solder filling.

Figure 12 is a view similar to Figure 7, showing the artificial tooth of Figure 9 in the articulator.

For convenience in describing, the process of swaging artificial teeth of gold has been illustrated and will be generally described: my invention being described in connection therewith in order to more completely emphasize its advantages.

Referring now in detail to the drawings, it will be seen from Figures 1 and 2, that a swaging device is illustrated, constructed in accordance with my invention, and comprising blocks 5 and 6, carrying, respectively, the die and counter-die. The block 5 is provided with sloping faces 7 and 8, converging in the male portion of the die, which latter consists of a plurality of elevations or formations 9, corresponding in shape to ordinary or typical teeth, thus providing a bank of teeth shapes arranged in accordance with and presenting the same contour as the natural teeth when in the mouth. The base of the tooth formation on the die is bordered by a pair of shoulders 10 and 11 for a purpose which will appear presently.

The counter-die or female portion is provided in the block 6, and takes the form of a V-shaped groove 12 having the tapering walls 13 and 14, the former having a plurality of depressions 15 formed therein and extending as at 16 to the wall 14, these depressions corresponding to the elevations 9, and adapted to receive said elevations when the die is being operated. The wall 13, at its outer end, is terminated in a longitudinal shoulder 17, and then slopes away at 18. The formation of the shoulder 11 provides a groove as shown in Figure 1, so that when the dies are assembled there is room for the edge of material being worked, this material being shown at 19 in Figure 1. The shoulder 17 cooperates with the shoulder 10 to provide a "flare" to the other edge of the material. The finished product, in section is shown in Figure 5, the cusp being indicated at 20, and the buccal portion of the gold casing at 21. A pair of integral completed gold cusps are shown in Figure 4, having the same reference characters as Figure 5, the product here being shown with a wax filling 22, and ready for disposition in the articulator.

After the gold cusp and buccal portions have been finished by the dies and filled with wax, they are inserted into the articulator, the latter being shown in Figure 3, and conventionally comprising the bent arms 23 and 24, pivotally connected at 25. An adjusting screw 26 is also provided. The arms carry plaster reproductions 27 and 28 of the upper and lower teeth to be replaced, the latter being indicated at 29, and comprising the members shown in Figure 4, secured to the plaster 27 between the abutment teeth 30—30'.

From this the proper occlusion is obtained.

In Figure 6, the dies are illustrated in forming a single cusp, or a plurality, if so desired. The cusp is indicated at 31, and is made for use in connection with a bridge-tooth having a porcelain facing. This latter construction is illustrated in Figures 9 and 12, inclusive, and comprises the cusp 31, gold supporting plate 32, and porcelain facing 33, the latter being secured by pins 34. This structure is first filled with wax 35 and placed on the articulator and set for proper occlusion; then removed and placed in the plaster impression 36, on the articulator (Fig. 12), the wax melted out, and solder substituted. Figure 12 shows the tooth in position for "melting out," and ready for solder substitution. Figure 11, shows the finished product in section, with solder 37 in place, and, in this case, the two bridge teeth ready for mounting on the coping. A detail discussion of the manner of applying coping, anchor pins to the teeth and the like will be omitted, as such is well known to those skilled in the art and has no bearing upon the invention here.

In Figure 7, an integral cusp and buccal portion is shown in the articulator ready for melting out, this being arranged in the melting out step the same as the structure of Figure 12. Figure 8 illustrates the cusp and buccal portions filled with wax ready for insertion into the impression as indicated in Figure 7.

As previously pointed out, it has been necessary, under the old method of forming gold cusps for bridge-work, to form the cusp and buccal portions of the tooth separate and when assembling, to connect these two portions by soldering. In view of the fact that great skill and considerable time are required for connecting these parts, together with the finishing process, this class of work is expensive. Furthermore, as the body of the tooth later applied is of solder, there is great danger of spoiling the joint between the cusp and buccal of the tooth. My invention reduces not only the work and time necessary, but also makes a smoother and more finished product in gold. The same results are obtainable in the event that a porcelain facing is employed.

Any variations of the die, the shape of the operating parts thereof, number of teeth to be formed, and the particular shape, location and size may be made, it, of course being desirable that the operator keep on hand a number of dies for the various teeth found to be necessary.

Minor changes, such as are enumerated above, may be made in the details without departing from the spirit of the invention and scope of the claims.

I claim:

1. A device for forming the cusp and buccal portions of an artificial tooth from a single piece of sheet material, comprising a pair of die members having each, respectively, a longitudinal groove and a complemental projection, a plurality of complemental depressions and elevations on said groove and projection, respectively, and corresponding only to the cusp and buccal portions of a normal set of human teeth, said groove and projection being adapted to receive a sheet of material therebetween in which the cusp and buccal portions of the artificial teeth are impressed by said depressions and elevations when said dies are joined.

2. In a device for forming the cusp and buccal portions of artificial teeth from a single sheet of material, comprising a pair of dies having each, respectively, a groove and a projection for engagement in said groove, a plurality of elevations on the projection corresponding in arrangement, shape and size to the cusp and buccal portions only of a series of adjacent human teeth, complemental depressions in said groove to receive said elevations, said dies adapted to receive a sheet of material therebetween, and when compressed serving to form said material into the shape of the cusp and buccal portions of human teeth.

3. In a device of the character described, in combination, a die couple comprising a die block provided with a longitudinal integral projecting flange substantially V-shaped in cross-section, a plurality of enlargements upon said flange near the apex thereof and conforming in shape and size to the cusp and buccal portions only of a continuous series of adjacent human teeth in their natural sequence, and a counter die comprising a block having depressions therein complemental to the enlargements of said die block.

4. In a device of the character described, in combination, a die couple comprising a die block provided with a longitudinal integral projecting flange substantially V-shaped in cross-section, a plurality of enlargements upon said flange near the apex thereof and conforming in shape and size to the cusp and buccal portions only of a continuous series of adjacent human teeth in their natural sequence, and a counter die member comprising a block provided with a longitudinal substantially V-shaped groove, said groove having a series of recesses in the bottom thereof conforming in shape and size to the cusp and buccal portions only of a continuous series of human teeth in their natural sequence, said recesses being complemental to said enlargements and said groove being complemental to said flange.

In testimony whereof, I affix my signature in the presence of two witnesses at 36 W. Randolph St., Chicago, Illinois.

CHRIST G. PAPANT.

Witnesses:
L. OPIE READ,
IRENE M. MARTIN.